United States Patent
Ikeda

(10) Patent No.: US 9,049,495 B2
(45) Date of Patent: Jun. 2, 2015

(54) INFORMATION PROCESSING SYSTEM, INFORMATION PROCESSING APPARATUS, CONTROL METHOD OF THESE, AND STORAGE MEDIUM

(71) Applicant: Makoto Ikeda, Kawasaki (JP)

(72) Inventor: Makoto Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/647,707

(22) Filed: Oct. 9, 2012

(65) Prior Publication Data
US 2013/0097631 A1    Apr. 18, 2013

(30) Foreign Application Priority Data
Oct. 17, 2011    (JP) .................................. 2011-228270

(51) Int. Cl.
*H04N 21/80* (2011.01)
*G01B 11/25* (2006.01)

(52) U.S. Cl.
CPC ................ *H04N 21/80* (2013.01); *G01B 11/25* (2013.01)

(58) Field of Classification Search
CPC .................................................... H04N 21/812
USPC ............................................ 382/103; 725/23
See application file for complete search history.

(56) References Cited

U.S. PATENT DOCUMENTS

2011/0243380 A1* 10/2011 Forutanpour et al. ......... 382/103

FOREIGN PATENT DOCUMENTS

| JP | 2002-149142 A | 5/2002 |
| JP | 2003-051931 A | 2/2003 |

* cited by examiner

*Primary Examiner* — Jefferey Harold
*Assistant Examiner* — Sihar Karwan
(74) *Attorney, Agent, or Firm* — Fitzpatrick, Cella, Harper & Scinto

(57) ABSTRACT

An information processing system comprising a transmitting apparatus and a receiving apparatus, wherein the transmitting apparatus comprises: a data embedding unit configured to generate a video signal by embedding image data in an effective display portion of the video signal and embedding control data for controlling processing to be executed using the image data in a portion of the video signal in which the image data is not embedded, and wherein the receiving apparatus comprises: a dividing unit configured to receive the video signal from the transmitting apparatus and divide the video signal into the image data and the control data.

14 Claims, 12 Drawing Sheets

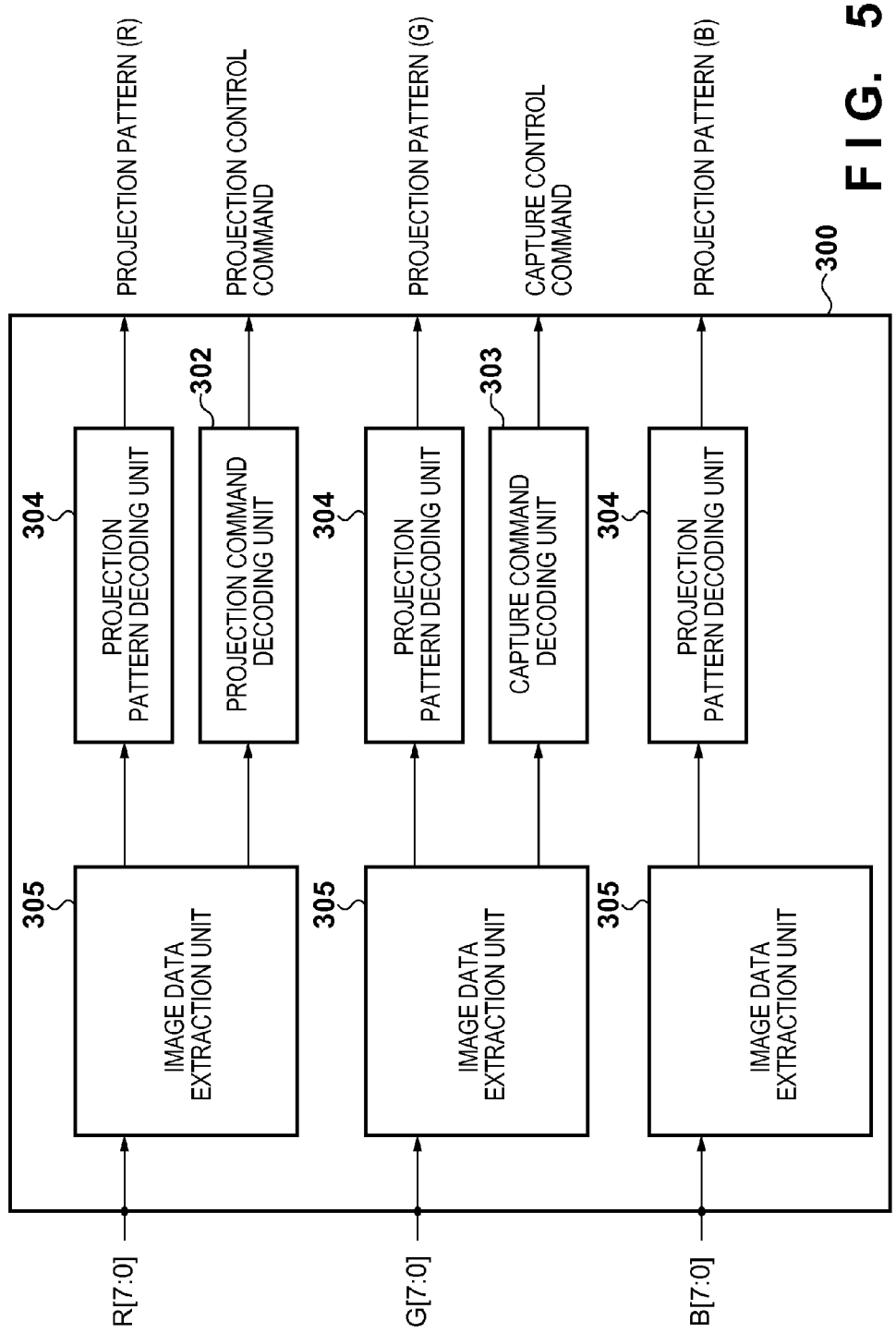

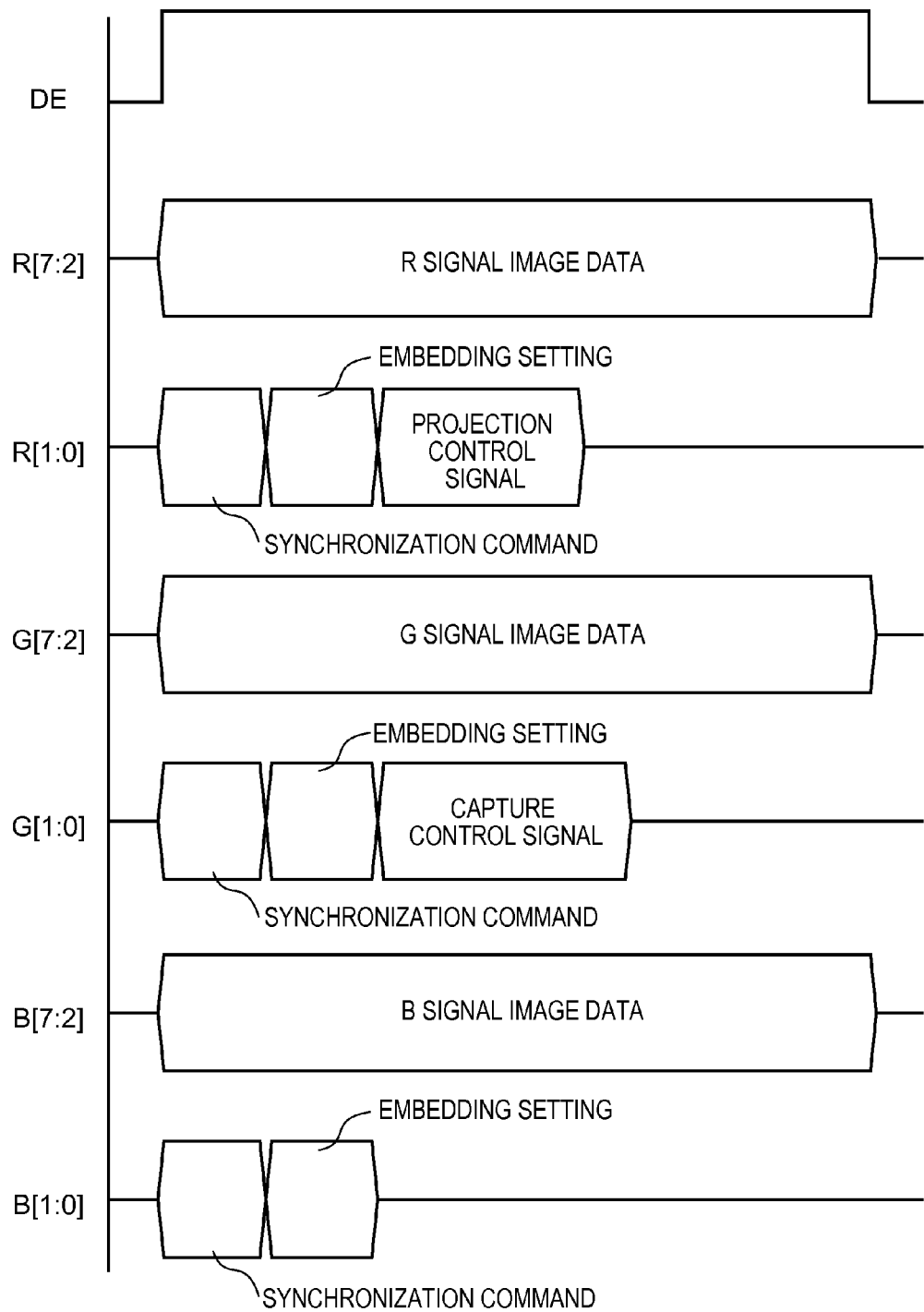

1
INFORMATION PROCESSING SYSTEM, INFORMATION PROCESSING APPARATUS, CONTROL METHOD OF THESE, AND STORAGE MEDIUM

BACKGROUND OF THE INVENTION

1. Field of the Invention

The present invention relates to information processing systems, information processing apparatuses, control methods of these, and storage media.

2. Description of the Related Art

In a case of transmitting video signals or control information, a versatile system can be configured at low cost by employing a general purpose interface standard such as DVI or RS-232C or the like. In a case of measuring the three-dimensional shape of an object or carrying out identification of an object by projecting multiple patterns onto the object while switching the patterns and capturing the object, it is necessary to synchronize and transmit the video signals for projecting the patterns and the camera control signals for capturing the projected patterns. However, it is difficult to achieve synchronization since multiple interfaces are required separately. Furthermore, multiple cables are necessary, which not only requires extra costs but also results undesirably in complex connections. That is, there is a need in systems in which image signals for display and control signals are transmitted simultaneously in that it is desired to use a general purpose interface standard without adding an interface for control signals. In Japanese Patent Laid-Open No. 2002-149142, control signals are superimposed onto image signals for display and transmitted by substituting control signals into a portion of the display image on the transmitting side and on the receiving side decoding is performed after dividing the image signals for display and the control signals.

Furthermore, in Japanese Patent Laid-Open No. 2003-51931, control signals are transmitted after being superimposed onto image signals for display by substituting control signals into only the least significant bit of the image data for display on the transmitting side, and decoding is performed on the receiving side by extracting the control signals from the image data for display.

However, in the method described in Japanese Patent Laid-Open No. 2002-149142, since a portion of the display screen (for example, several lines of the upper edge) is entirely substituted with control signals and then transmitted, there is an issue in that a portion of the received image will be undesirably deficient and that the effective image area becomes smaller. Furthermore, in the method described in Japanese Patent Laid-Open No. 2003-51931, although there is no localized deficiency in the display screen, deterioration of the image across the entire screen does occur. Although there is almost no influence in terms of human visual perception by substituting only the least significant bit, in a case where image projection patterns are to be captured by a capture device such as a camera, this is recognized undesirably as noise, and in particular in a case of transmitting large volumes of control data, there is a problem in that this influence increases.

SUMMARY OF THE INVENTION

In light of the aforementioned problems, the present invention provides a technology by which image signals and control signals can be synchronized and transmitted without incurring loss of image data or deterioration in image quality.

According to one aspect of the present invention, there is provided an information processing system comprising a transmitting apparatus and a receiving apparatus, wherein the transmitting apparatus comprises: a data embedding unit configured to generate a video signal by embedding image data in an effective display portion of the video signal and embedding control data for controlling processing to be executed using the image data in a portion of the video signal in which the image data is not embedded, and wherein the receiving apparatus comprises: a dividing unit configured to receive the video signal from the transmitting apparatus and divide the video signal into the image data and the control data.

According to one aspect of the present invention, there is provided a control method of an information processing system comprising a transmitting apparatus and a receiving apparatus, wherein in the transmitting apparatus, a data embedding step is executed of generating a video signal by embedding image data in an effective display portion of a video signal and embedding control data for controlling processing to be executed using the image data in a portion of the video signal in which the image data is not embedded, and in the receiving apparatus, a dividing step is executed of receiving the video signal from the transmitting apparatus and dividing the video signal into the image data and the control data.

Further features of the present invention will be apparent from the following description of exemplary embodiments with reference to the attached drawings.

BRIEF DESCRIPTION OF THE DRAWINGS

FIG. 5 is a diagram for describing operation of a decoding unit in a case where the image data is a low gradation color image and control data is embedded in the least significant 7 bits.

FIGS. 8A and 8B are diagrams for describing operation of a data embedding unit in a case where the image data is a low gradation color image and the number of bits in which control data is to be embedded is set according to a data embedding setting signal.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
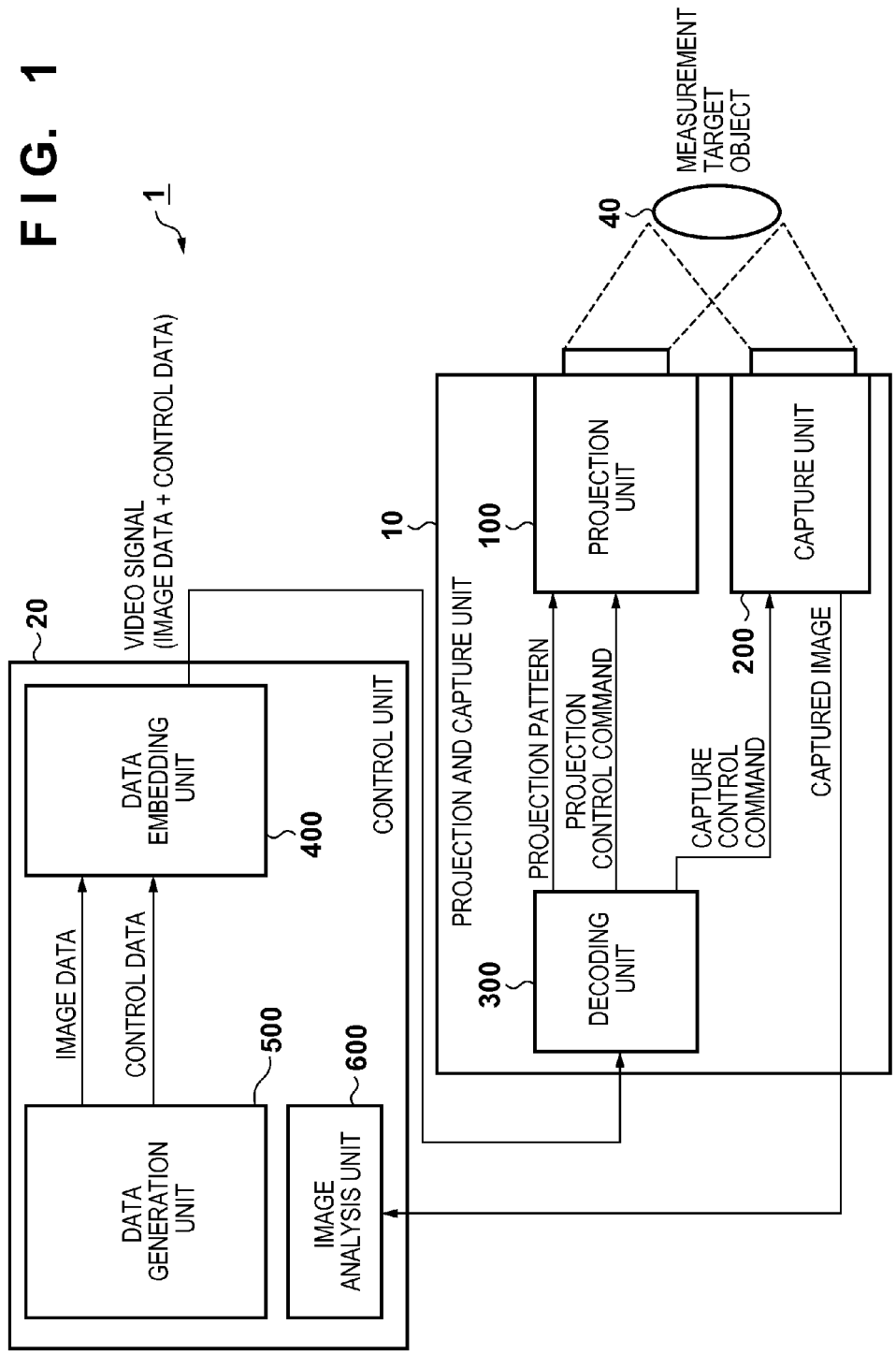
FIG. 1 is a block diagram showing a configuration of a projection and capture measuring system according to a first embodiment.

FIG. 1 is a block diagram showing a configuration of a projection and capture measuring system 1 that functions as an information processing system according to a first embodiment. The projection and capture measuring system 1 is provided with a projection and capture unit 10 that executes a process in which a predetermined pattern is projected onto a measurement target object 40 and captured, and a control unit 20, which carries out generation of control signals to each processing unit within the projection and capture unit 10 and projection patterns, and executes processing of the captured image that has been captured.

In the present embodiment, the control unit 20, which functions as a transmitting apparatus, embeds image data in the signal data that constitutes the video signal, and embeds control data for controlling a process that is executed by the projection and capture unit 10, which functions as a receiving apparatus, using that image data in unused portions of the signal data (that is, in portions where image data is not embedded). The projection and capture unit 10 receives a video signal from the control unit 20 and divides this video signal into image data and control data, and generates projection patterns, projection control signals, and capture control signals and the like.

Hereinafter, specific description is given regarding a configuration of the projection and capture unit 10 and the control unit 20. The projection and capture unit 10 functions as a receiving apparatus and is provided with a projection unit 100, a capture unit 200, and a decoding unit 300.

The projection unit 100 projects predetermined projection patterns onto the measurement target object 40 with a timing specified by a projection control command. The capture unit 200 captures the patterns that are projected onto the measurement target object 40 with a timing specified by a capture control command. The decoding unit 300 divides the inputted video signal into image data (projection patterns), and control commands, which include projection control commands and capture control commands.

The control unit 20 functions as a transmitting apparatus and is provided with a data embedding unit 400, a data generation unit 500, and an image analysis unit 600. The data generation unit 500 generates image data (projection patterns) to be displayed by the projection unit 100 and control data by which the operations of the projection and capture unit 10 are controlled. The control data includes projection control data for setting the lighting timings of projection patterns and the luminance of the light source in the projection unit 100, and capture control data for setting the capture timings and capture range in the capture unit 200.

The data embedding unit 400 embeds control data into redundant portions of the image data (projection patterns) with bit numbers determined according to a degree of redundancy of the image data (projection patterns), and outputs this as a video signal in a general purpose video interface format.

The image analysis unit 600 carries out analysis by obtaining captured image data, and based on an analysis result thereof, the data generation unit 500 generates the projection pattern to be projected next and control data to the projection unit 100 and the capture unit 200.

Here, description is given regarding overall operations using as an example a shape measuring method using a pattern projection method. In the case of a pattern projection method called a space encoding method, the control unit 20 transmits projection patterns to the projection unit 100 so that Gray code patterns of negatives and positives are displayed, and the projection unit 100 projects these projection patterns onto the measurement target object 40. The reflected light of the Gray code pattern reflected by the surface of the measurement target object 40 is transformed by the shape of the measurement target object 40 since it is captured by the capture unit 200 at a different angle and is received by an image sensor through an imaging optical system of the capture unit 200. The received reflected light undergoes photoelectric conversion, is outputted to the image analysis unit 600 as captured image data to undergo image analysis, and the pattern to be projected next and control data to the projection unit 100 and the capture unit 200 is outputted to the data generation unit 500. In this way, Gray code patterns of both negatives and positives are projected onto the measurement target object 40, and by calculating code values from boundary positions of the negative and positive images, distance information is calculated according to a principle of triangulation.

At this time it is necessary to match the timings of projection and capture to carry out capture while switching multiple projection patterns. For this reason, the control unit 20 generates projection control signals for the projection unit 100 for setting a display commencement, display period, and display luminance and the like, and generates capture control signals for the capture unit 200 for setting a capture commencement, exposure time, and gain during capture and the like. The image data generated by the data generation unit 500 provided in the control unit 20 (data in which redundant portions of projection patterns are reduced) and the control data (the capture control signals and the projection control signals) are embedded in the same video signal by the data embedding unit 400 and transmitted to the projection and capture unit 10.

Furthermore, it is necessary to switch the projection pattern frame by frame to carry out faster projection and capture processing, and by using a signal in which the control data is complete in a single frame and updating frame by frame, it is possible to perform control in synchronization by frame.

The video signal inputted to the projection and capture unit 10 is divided into image data and control data by the decoding unit 300, and the redundant portions of the image data are reproduced to generate the projection patterns, and the projection control signal and the capture control signal are extracted from the control data. Moreover, the control data is decoded into a command format for directly controlling the projection unit 100 and the capture unit 200.

Next, detailed description is given regarding operations of the data embedding unit 400 and the decoding unit 300, which are features of the present invention. For projection patterns used in pattern projection method-based shape measurements, it is common to use patterns having redundancy, which is different from natural images. Hereinafter, description is given regarding these cases respectively using examples of projection patterns having redundancy.

Single Color Image

Figure 2A:
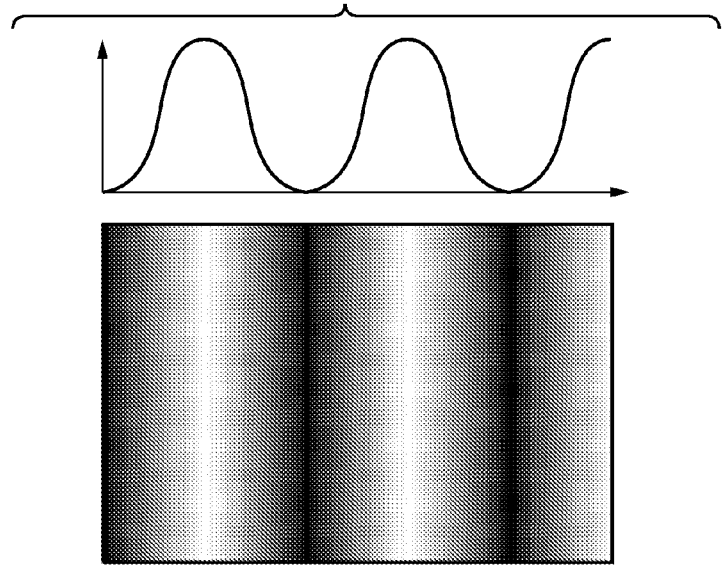
FIGS. 2A and 2B are diagrams for describing operation of a data embedding unit in a case where the image data is a single color image and control data is in the R signal.

For example, if the projection pattern is a grayscale, 256 gradations sine wave as shown in FIG. 2A, then single color 8 bits are sufficient as image data since all the signals of the RGB signal data are the same data. That is, in a case where 8-bit sine wave data is input only in G signal data for example, then the R signal and the B signal can be used as control data. It should be noted that hereinafter description is given using RGB video signals, which are assumed to be digital video signals constituted by color signals of the three primary colors of red, green, and blue. Furthermore, a DE (data enable) signal refers to a high active signal, which is a signal that indicates a video effective display period. A period in which the DE signal is low is a horizontal synchronizing signal period or a vertical synchronizing signal period of the video.

Figure 2B:
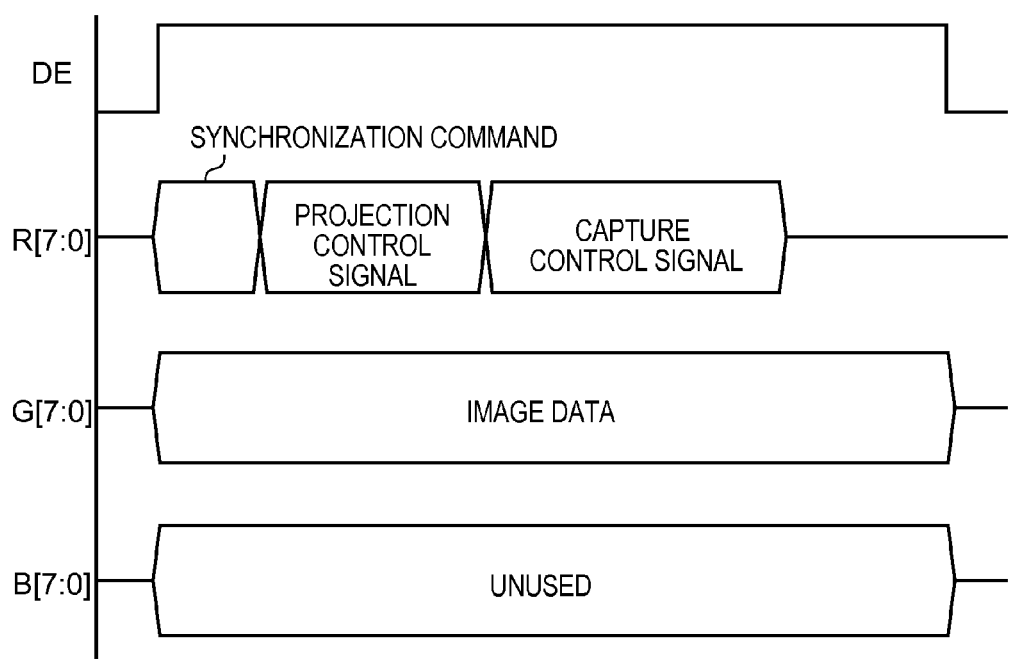

Here, FIG. 2B shows an example of embedding by the data embedding unit 400 when image data is embedded in the G signal and control data is embedded in the R signal. The data embedding unit 400 embeds 8-bit sine wave data, which is the projection pattern, in the G signal as image data. Furthermore, an 8-bit projection control signal and capture control signal are embedded as control data in the R signal. The B signal is unused.

A synchronization command signal is a signal indicating which position in the video effective display period the control data is embedded, and is set in a pattern that does not appear in the ordinary control data sequence so that it is not falsely recognized as control data. Although fundamentally for this purpose the control data may be embedded at any position in the video effective display period for each pixel, in order to improve the reliability of detection, the control data may be prescribed so as to be placed at the head of the first video effective line of the frame for example. Furthermore, in a case where the control data is not to be embedded, in order to make this clear, a different synchronization command signal may be defined for a case where there is control data and a case where there is none.

Figure 3:
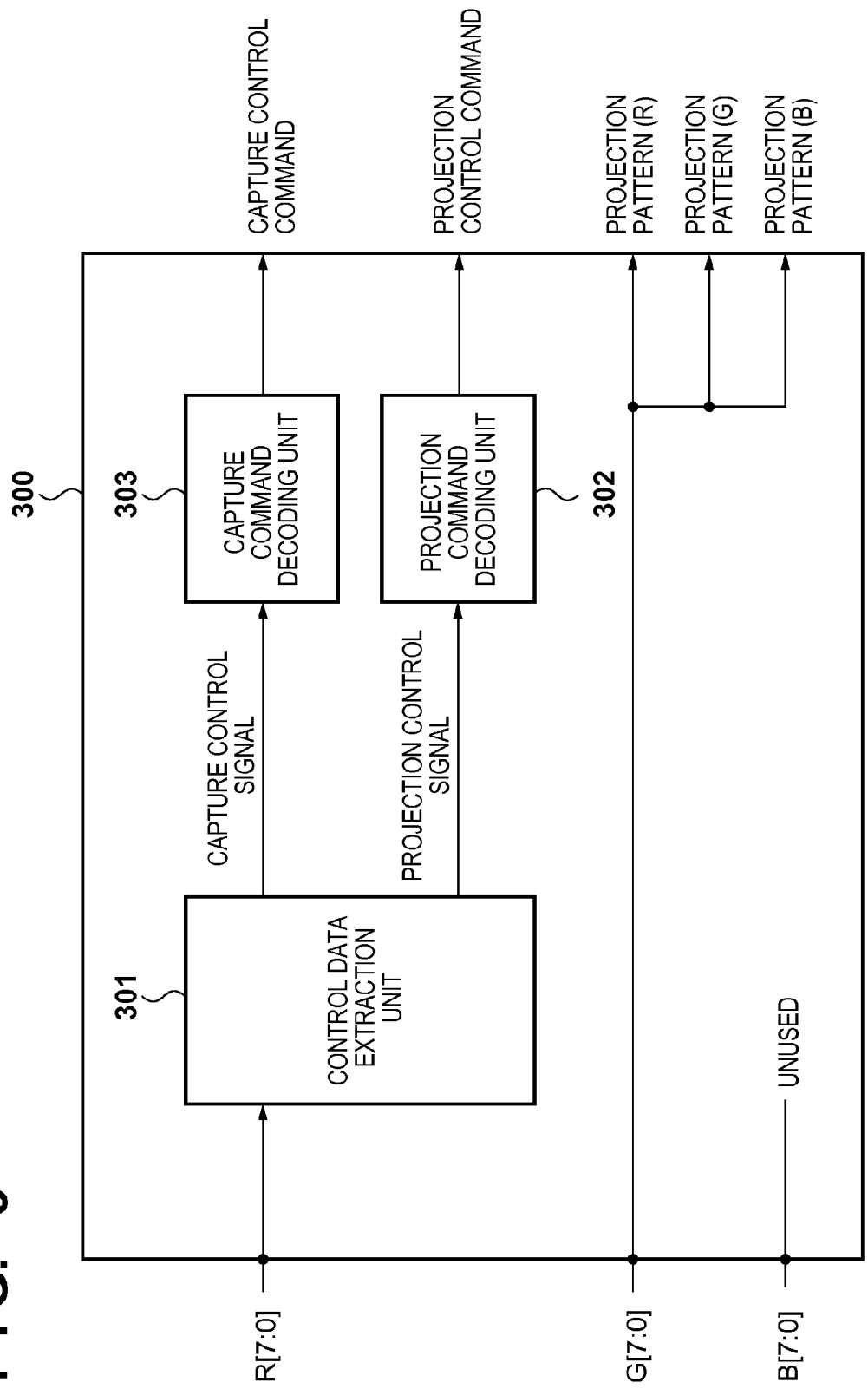
FIG. 3 is a diagram for describing operation of a decoding unit in a case where the image data is a single color image and control data is in the R signal.

On the other hand, as shown in FIG. 3, the decoding unit 300 generates grayscale, 256 gradations sine wave R signals and B signals, which are projection patterns, from the 8-bit G signal input, which is image data, and combines the RGB to reproduce 24-bit projection patterns.

In FIG. 3, the decoding unit 300 is provided with a control data extraction unit 301, a projection command decoding unit 302, and a capture command decoding unit 303. The control data extraction unit 301 extracts the projection control signal and the capture control signal when a synchronization command signal is detected from the R signal input, which is the control data. Then, using the projection command decoding unit 302 and the capture command decoding unit 303, it decodes these into a command format capable of directly controlling the projection unit 100 and the capture unit 200 and actual control is carried out.

Furthermore, in this example only the R signal is used in the transmitting of control data, but it is also possible to embed projection control data into the R signal and capture control data into the B signal for example.

Further still, in this example, image data and control data and the like are used as an example of data relating to the projection unit 100 and the capture unit 200 provided in the projection and capture unit 10, but data to be embedded in the video signal is not limited to these. For example, a command for controlling an external apparatus such as a robot arm may be embedded as control data, and a projection pattern to be displayed by an external apparatus such as a second projection unit may be embedded in the B signal, which is unused in the above-described example, as image data.

Low Gradation Color Image

Figure 4A:
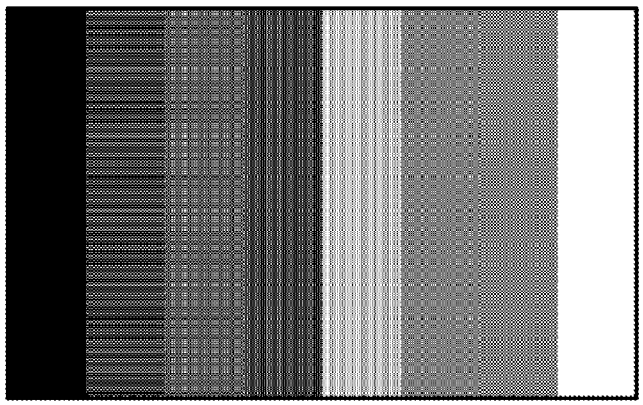
FIGS. 4A and 4B are diagrams for describing operation of the data embedding unit in a case where the image data is a low gradation color image and control data is embedded in the least significant 7 bits.

For example, if the projection pattern is an 8-color color pattern such as the color bar shown in FIG. 4A, then there are different RGB values for each pixel, but 8-bit gradations for each color are not necessary as the image data. That is, the most significant several bits can be used as the image data for each color, and the remaining bits can be used as control data.

Figure 4B:
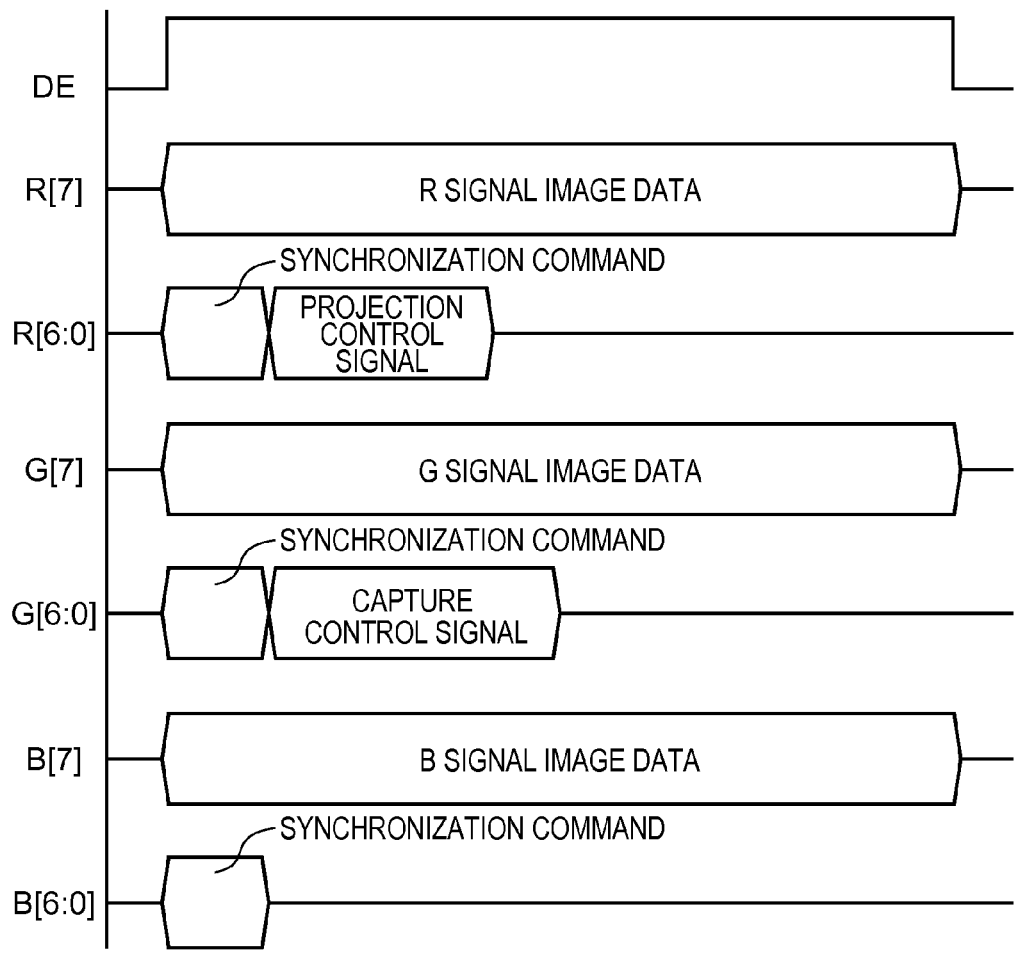

Here, FIG. 4B shows an example of embedding by the data embedding unit 400 when image data is embedded in the most significant 1 bit of each RGB signal and control data is embedded in the least significant 7 bits. The data embedding unit 400 embeds "1" in the most significant 1 bit if the projection pattern is FF and embeds "0" in the most significant 1 bit if the projection pattern is "0" as image data for each color of the RGB signals. Furthermore, projection control signals are embedded as control data in the least significant 7 bits of the R signal and capture control signals are embedded as control data in the least significant 7 bits of the G signal. The least significant bits of the B signal are unused.

A synchronization command signal is a signal indicating which position in the video effective display period the control data is embedded, and is set in a pattern that does not appear in the ordinary control data sequence so that it is not falsely recognized as control data. Although fundamentally for this purpose the control data may be embedded at any position in the video effective display period for each RGB signal, in order to improve the reliability of detection, the control data may be prescribed so as to be placed at the head of the first video effective line of the frame of all RGB signals for example. Furthermore, in a case where the control data is not to be embedded as with the B signal in this example, in order to make this clear, a different synchronization command signal may be defined for a case where there is control data and a case where there is none.

On the other hand, in the example shown in FIG. 5, the decoding unit 300, which processes signal data such as that in FIGS. 4A and 4B, is provided with a projection command decoding unit 302, and capture command decoding unit 303, a projection pattern decoding unit 304, and an image data extraction unit 305.

The decoding unit 300 generates a "00h" or "FFh" signal, which are projection patterns for each color, from the most significant 1 bit of each RGB inputted signal, which is image data, and combines the RGB to reproduce 24-bit projection patterns. The image data extraction unit 305 extracts image data and control data when a synchronization command signal is detected from the signal input of RGB. Then, the projection pattern decoding unit 304 decodes an 8-bit projection pattern from the extracted 1 bit image data. The 7-bit control data (projection control signal) extracted from the R signal input is decoded into a command format by the projection command decoding unit 302 so that the projection unit 100 can be directly controlled. The 7-bit control data (capture control signal) extracted from the G signal input is decoded into a command format by the capture command decoding unit 303 so that the capture unit 200 can be directly controlled.

Furthermore, in this example, the number of bits of image data and control data to be embedded is the same in each of the RGB signals, but it is not absolutely necessary for these to be the same. For example, the number of bits of image data may be set to 2 bits, 2 bits, and 4 bits for R, G, and B respectively for a total of 8 bits such that a 256 color palette may be used.

According to the present embodiment, control data is embedded at the transmitting side in a redundant portion of the image data of the video signal, and therefore the original image data can be reproduced entirely at the receiving side.

Furthermore, the image data and the control data are transmitted in a same video signal, and therefore not only can a cable for control data be eliminated, but a general purpose interface can be used for output of the data transmitting PC, and the system can be configured at low cost. Furthermore, by using only a video signal interface, as well as transmitting the image data, it is also possible to control multiple devices on a single device basis according to multiple sets of control information included in the control data. Further still, since the control command can be updated the video signal frame by frame, it is possible to control other devices in synchronization with the image data.

Second Embodiment

Figure 6:
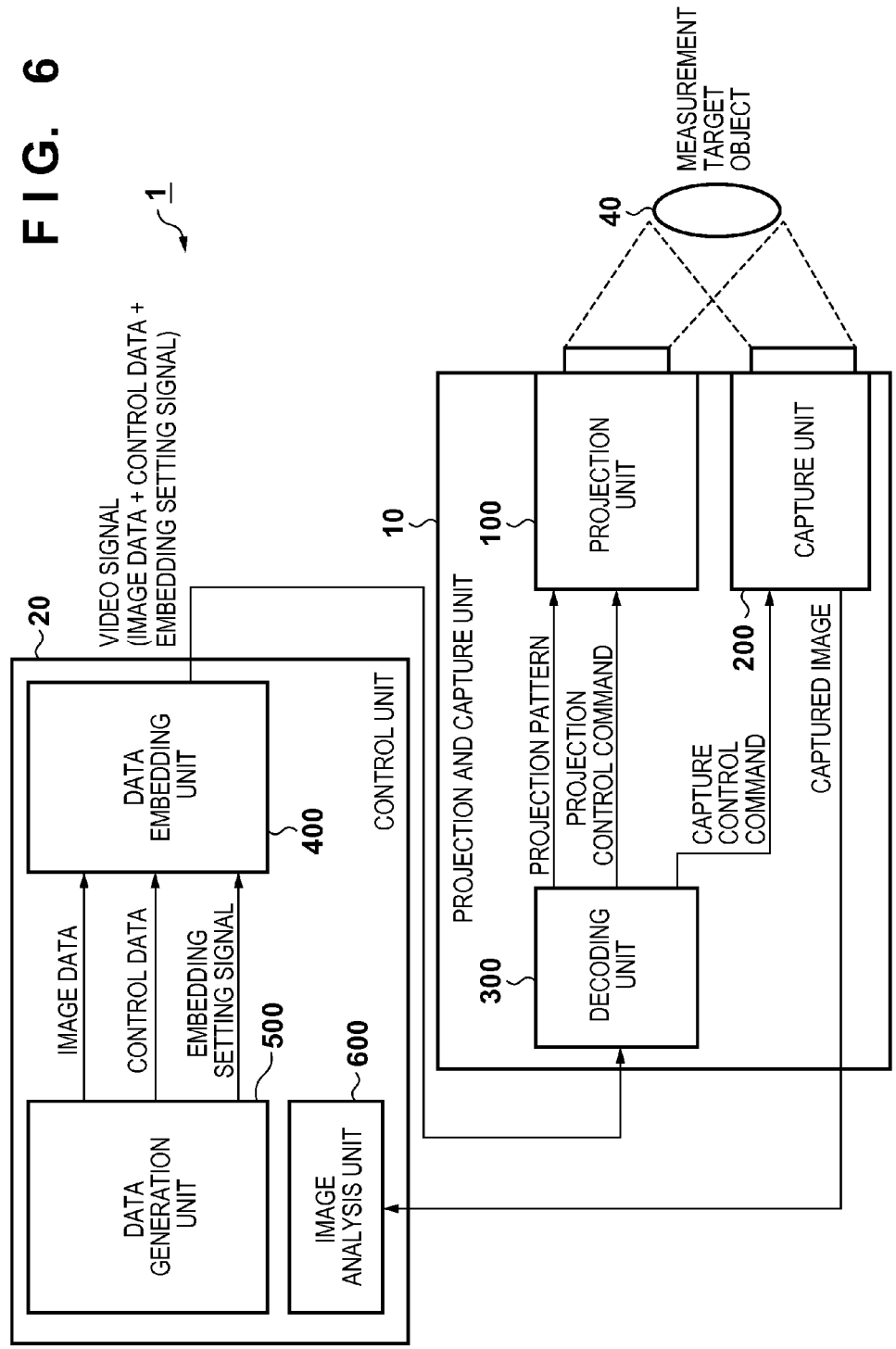
FIG. 6 is a block diagram showing a configuration of a projection and capture measuring system according to a second embodiment.

FIG. 6 is a block diagram showing a configuration of a projection and capture measuring system 1 according to a second embodiment. A point of difference from the first embodiment is that a further embedding setting signal is generated by the data generation unit 500 of the control unit 20. the configurations other than the data generation unit 500, the data embedding unit 400, and the decoding unit 300 are the same as in the first embodiment, and therefore description thereof is omitted.

The embedding setting signal refers to a signal for specifying how bits are to be reduced when converting a projection pattern to image data for transmitting. For example, when the embedding setting signal is "00h," data is embedded in a format of single color image (image data=G data, control data=R data), and when the embedding setting signal is "01h", data is embedded in a format of two gradations per color (image data=most significant 3 bits, control data=least significant 5 bits), such that one format is selected for transmitting from multiple predetermined formats. The embedding setting signal is a signal that indicates a relationship between the number of bits of image data and the number of bits of control data. By doing this, the number of bits of image data can be adjusted in accordance with the degree of redundancy in the projection patterns.

The data embedding unit 400 embeds the image data, control data (projection control signal, capture control signal), and embedding setting signal generated by the data generation unit 500 into the same video signal in accordance with the value of the embedding setting signal, and transmits this to the projection and capture unit 10.

The video signal inputted to the projection and capture unit 10 is divided into image data and control data by the decoding unit 300 in accordance with the embedding setting signal embedded in the video signal. Further still, the redundant portion of the image data is reproduced in accordance with the value of the embedding setting signal and the projection pattern is generated, and the projection control signal and the capture control signal are extracted from the control data and decoded into a command format such that the projection unit 100 and the capture unit 200 respectively can be directly controlled.

Next, more detailed description is given regarding operations of the data embedding unit 400 and the decoding unit 300, which are featured portions of the present embodiment. A case of the "single color image" shown in FIG. 2A according to the first embodiment and a case of the "low gradation color image" shown in FIG. 4A are used as examples of projection patterns.

Single Color Image

Figure 7A:
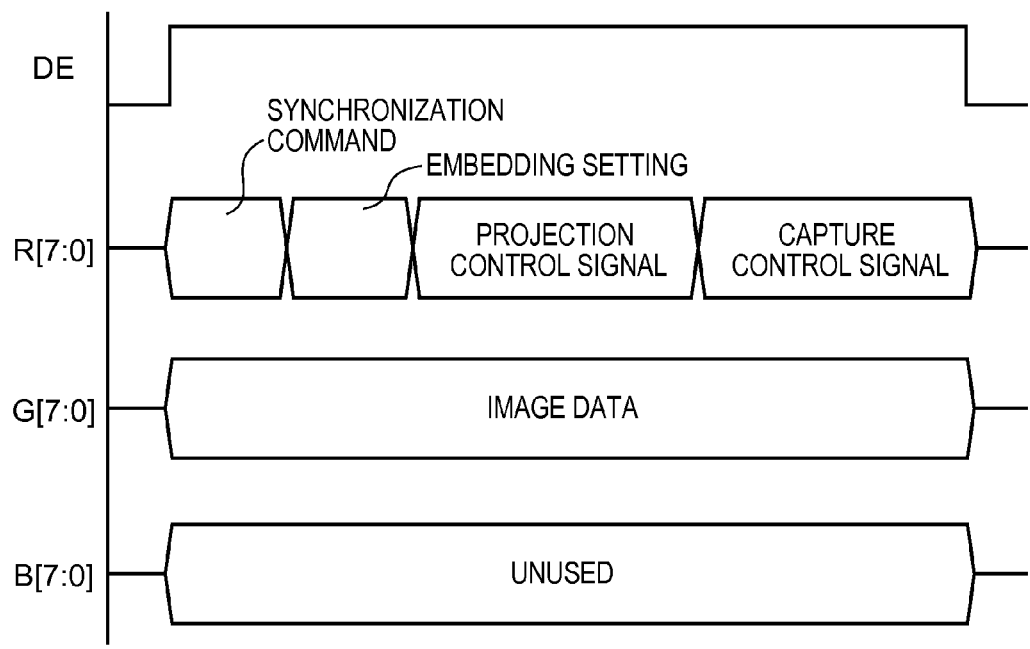
FIGS. 7A and 7B are diagrams for describing operation of a data embedding unit in a case where the image data is a single color image and a signal is selected to embed control data according to a data embedding setting signal.

In a case where the projection pattern is a grayscale, 256 gradations sine wave as shown in FIG. 2A described in the first embodiment, then single color 8 bits are sufficient as image data since all the signals of the RGB signal data are the same data as in the first embodiment. That is, in a case where 8-bit sine wave data is input only in G signal data, then the R signal and the B signal can be used as control data. Here, FIG. 7A shows an example of embedding by the data embedding unit 400 when image data is embedded in the G signal and control data is embedded in the R signal. The data embedding unit 400 embeds 8-bit sine wave data, which is the projection pattern, in the G signal as image data. Furthermore, an embedding setting signal, and an 8-bit projection control signal and capture control signal are embedded as control data in the R signal. The B signal is unused. Since the synchronization command signal is the same as in the first embodiment, description thereof is omitted.

Low Gradation Color Image

In a case where the projection pattern is an 8-color color pattern such as the color bar as shown in FIG. 4A described in the first embodiment, then there are different RGB values for each pixel in a same manner as in the first embodiment, but 8-bit gradations for each color are not necessary as the image data. That is, the most significant several bits can be used as the image data for each color, and the remaining bits can be used as control data.

Figure 8A:
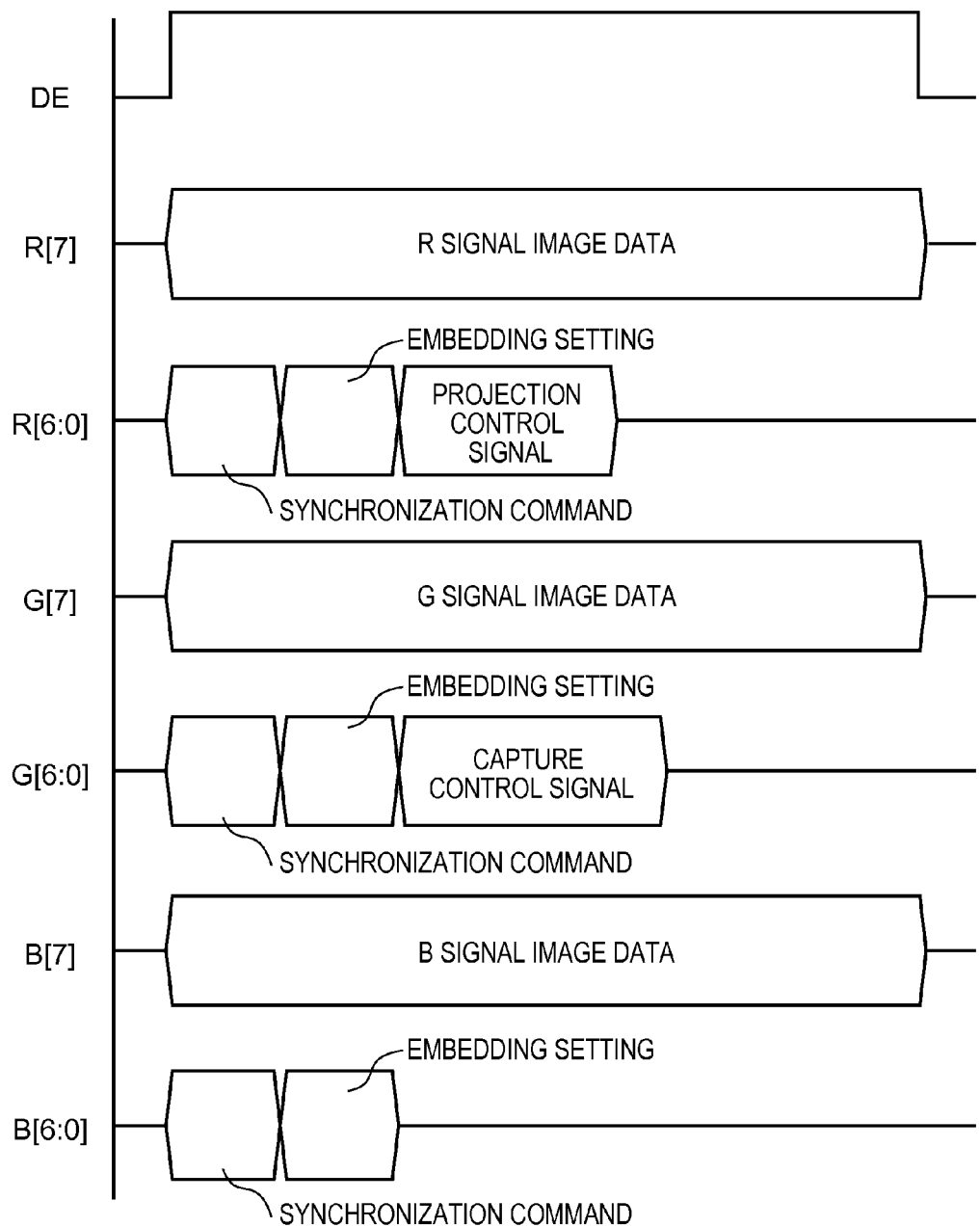

Here, FIG. 8A shows an example of embedding by the data embedding unit 400 in a case where image data is embedded in the most significant 1 bit of each RGB signal and control data is embedded in the least significant 7 bits. The data embedding unit 400 embeds "1" in the most significant 1 bit if the projection pattern is FF and embeds "0" in the most significant 1 bit if the projection pattern is "0" as image data for each color of the RGB signal data. Furthermore, the embedding setting signal is embedded in the least significant 7 bits of each of the RGB signals, and further still, projection control signals are embedded as control data in the R signal and capture control signals are embedded as control data in the G signal. The control data of the B signal is unused. It should be noted that as shown in FIG. 8B, gradations of the image data may be embedded in the most significant 6 bits and the control data may be embedded in the least significant 2 bits.

Figure 9:
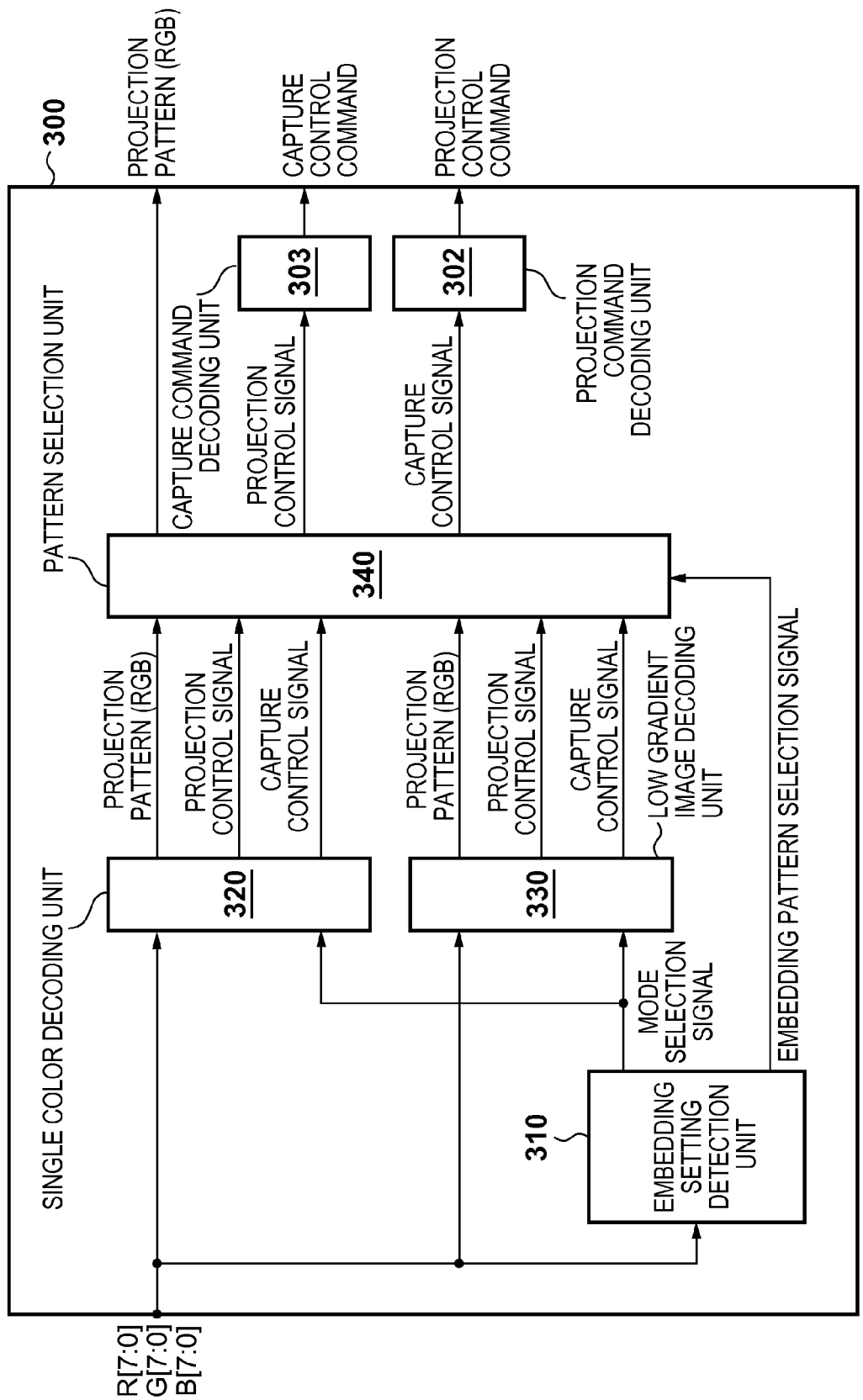
FIG. 9 is a block diagram of the decoding unit 300 in a case where a method of embedding control data is selected according to a data embedding setting signal.

Next, description is given with reference to FIG. 9 regarding a configuration example of the decoding unit 300 according to the present embodiment. The decoding unit 300 is provided with the projection command decoding unit 302, the capture command decoding unit 303, an embedding setting detection unit 310, the single color image decoding unit 320, a low gradation image decoding unit 330, and a pattern selection unit 340.

The embedding setting detection unit 310 extracts the embedding setting signal from the RGB input signal and outputs a selection signal to each block. The single color image decoding unit 320 is the decoding unit in a case where the projection pattern is the aforementioned single color image. The low gradation image decoding unit 330 is the decoding unit in a case where the projection pattern is the aforementioned low gradation color image. The pattern selection unit 340 selects the signal of either the single color image decoding unit 320 or the low gradation image decoding unit 330 according to an embedding selection signal extracted by the embedding setting detection unit 310. The projection command decoding unit 302 and the capture command decoding unit 303 are the same as in the first embodiment, and therefore description thereof is omitted.

Figure 7B:
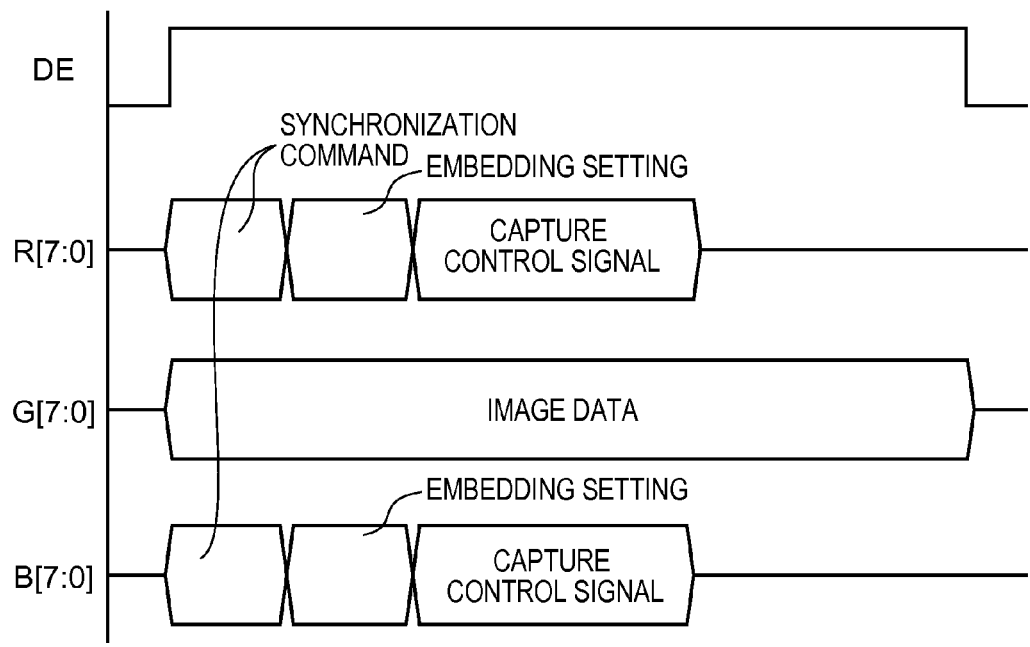

Here, description is given regarding an example of setting the embedding setting signal. Consider a case in which the least significant bit of the embedding setting signal is used as an embedding pattern selection signal for the pattern selection unit 340 and the second bit is used as a mode selection signal within the single color image decoding unit 320 and the low gradation image decoding unit 330. For example, when the embedding pattern selection signal is "0," the pattern selection unit 340 selects the output of the single color image decoding unit 320, and when the selection signal is "1," it selects the output of the low gradation image decoding unit 330. Furthermore, for mode selection within the single color image decoding unit 320, when the mode selection signal is "0," the B signal is set to an unused mode as shown in FIG. 7A, and when the mode selection signal is "1," a mode is set in which the capture control signal is embedded in the B signal as shown in FIG. 7B. For mode selection within the low gradation image decoding unit 330, when the mode selection signal is "0," a mode is set as shown in FIG. 8A in which the gradation of the image data is embedded as the most significant 1 bit and the control data is embedded as the least significant 7 bits, and when the mode selection signal is "1," a mode is set as shown in FIG. 8B in which the gradation of the image data is embedded as the most significant 6 bits and the control data is embedded as the least significant 2 bits.

When the Embedding Setting Signal is "00" or "10"

Figure 10:
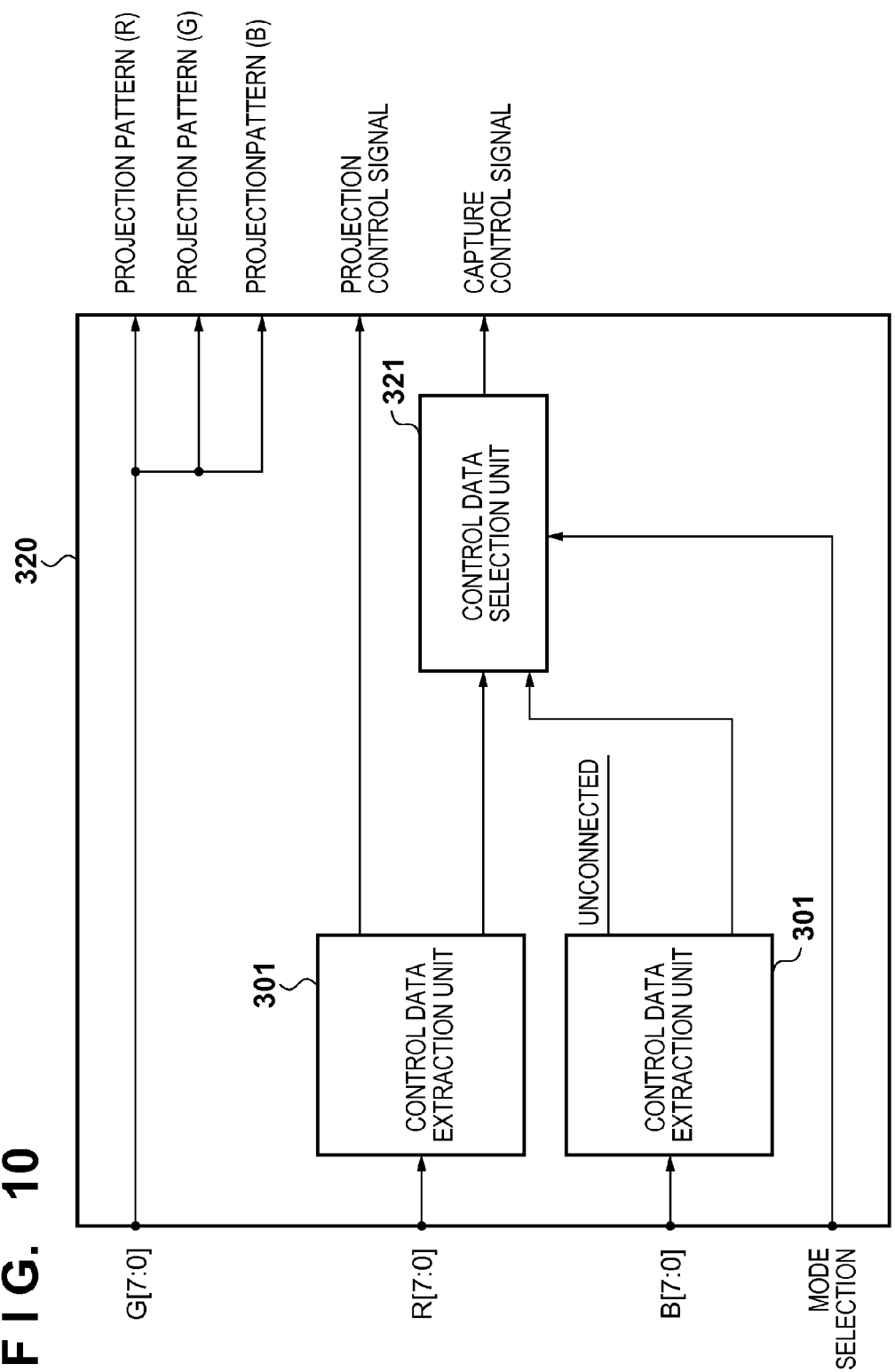
FIG. 10 is a block diagram showing a configuration of a single color image decoding unit 320.

The single color image decoding unit 320 is selected as the decoding unit since the lower order bit of the embedding control signal is "0," and the mode is selected using the upper order bit of the embedding control signal. FIG. 10 shows a configuration of the single color image decoding unit 320 at this time. The single color image decoding unit 320 is provided with the control data extraction unit 301 and a control data selection unit 321. Since the control data extraction unit 301 is the same as in the first embodiment, description thereof is omitted. The control data selection unit 321 selects the capture control signal extracted from the R signal when the mode selection signal is "0," and selects the capture control signal extracted from the B signal when the mode selection signal is "1." On the other hand, data extracted from the R signal is outputted for the projection control signal regardless of the mode selection signal. In regard to the projection pattern, the R signal and the B signal are generated from the 8-bit G signal input and 24-bit data is reproduced by combining the RGB.

Furthermore, in this example, image data and control data are used as an example of data relating to the projection unit 100 and the capture unit 200 provided in the projection and capture unit 10, but data to be embedded is not limited to these.

When the Embedding Setting Signal is "01" or "11"

Figure 11:
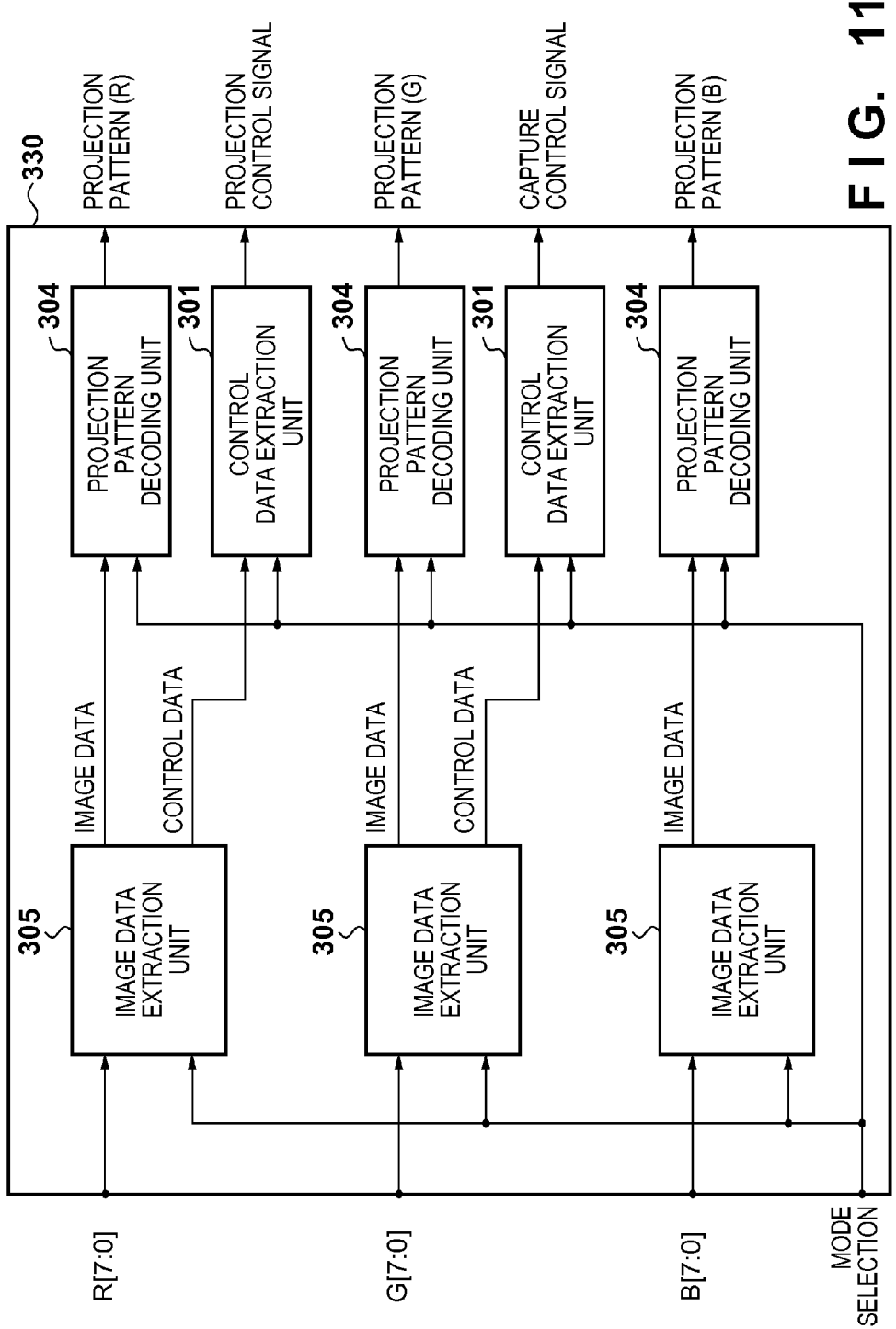
FIG. 11 is a block diagram showing a configuration of a low gradation image decoding unit 330.

The low gradation image decoding unit 330 is selected as the decoding unit since the lower order bit of the embedding control signal is "1," and the mode is selected using the upper order bit of the embedding control signal. FIG. 11 shows a configuration of the low gradation image decoding unit 330 at this time. The low gradation image decoding unit 330 is provided with the control data extraction unit 301, the projection pattern decoding unit 304, and the image data extraction unit 305.

The image data extraction unit 305 extracts the most significant 1 bit of the input signal when the mode selection signal is "0," and extracts the most significant 6 bits of the input signal when the mode selection signal is "1." The projection pattern decoding unit 304 generates a "00" or "FF" 8-bit pattern from the 1-bit image data when the mode selection signal is "0," and generates 64 types of 8-bit patterns from the 6-bit image data when the mode selection signal is "1." The control data extraction unit 301 extracts the least significant 7 bits of the input signal when the mode selection signal is "0," and extracts the least significant 2 bits of the input signal when the mode selection signal is "1." Furthermore, when the mode selection signal is "1," the embedded control data is data of the least significant 2 bits, but in a case where the data structure of the control signal is in a 6-bit unit for example, the extracted 2-bit data undergoes parallel conversion to a 6-bit control signal for output. That is, in this case, a single control signal is constituted by three pixels. Furthermore, in this example, the number of bits of image data and control data to be embedded is the same in each of the RGB signals, but it is not necessary for these to be the same.

According to the present embodiment, the number of bits of control data can be freely changed depending on the degree of redundancy of the image data, and therefore when image data having a low degree of redundancy must be displayed, only a small amount of control data can be transmitted, but on the other hand when image data having a high degree of redundancy is to be displayed, a large amount of control data can be transmitted. Furthermore, in a case of image data having a high degree of redundancy, multiple sets of image data and control signals are transmitted within the same video signal interface, and therefore it is possible to control multiple image displays and external devices.

According to the present invention, image signals and control signals can be synchronized and transmitted without incurring loss of image data or deterioration in image quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-228270 filed on Oct. 17, 2011, which is hereby incorporated by reference herein in its entirety.

What is claimed is:

1. An information processing system comprising a transmitting apparatus and a receiving apparatus,
wherein the transmitting apparatus comprises:
a first obtaining unit configured to obtain image data of a projection pattern to be projected onto an object;
a second obtaining unit configured to obtain control data including control information for controlling processing to be executed in at least one of a projection unit and an image capturing unit using the image data; and
a data embedding unit configured to generate a video signal by embedding the image data in an effective display portion of the video signal and embedding the control data in a portion of the video signal in which the image data is not embedded so that the control data of the video signal itself controls processing to be executed in at least one of the projection unit and the image capturing unit, and wherein the receiving apparatus comprises:
a dividing unit configured to receive the video signal from the transmitting apparatus and divide the video signal into the image data and the control data so that the control data of the received video signal itself controls processing to be executed in at least one of the projection unit and the image capturing unit.

2. The information processing system according to claim 1, wherein the control data includes multiple sets of control information that is set device by device for controlling processing to be executed in each device using the image data.

3. The information processing system according to claim 1, wherein the control data includes control information for controlling, frame by frame, processing to be executed using the image data.

4. The information processing system according to claim 1, wherein the data embedding unit further embeds an embedding setting signal indicating a relationship between the number of bits of the image data and the number of bits of the control data in a portion of the video signal in which the image data is not embedded.

5. The information processing system according to claim 1, wherein the data embedding unit embeds multiple sets of image data in the video signal that constitutes the video signal.

6. The information processing system according to claim 1, wherein the receiving apparatus comprises:
a control unit configured to generate a projection pattern based on the image data and generate a control signal based on the control data,
a projection unit configured to project the projection pattern onto a target object based on the control signal, and
a capture unit configured to capture the target object on which the projection pattern has been projected based on the control signal.

7. A control method of an information processing system comprising a transmitting apparatus and a receiving apparatus,
wherein in the transmitting apparatus,
a first obtaining step is executed of obtaining image data of a projection pattern to be projected onto an object;
a second obtaining step is executed of obtaining control data including control information for controlling processing to be executed in at least one of a projection unit and an image capturing unit using the image data; and
a data embedding step is executed of generating a video signal by embedding the image data in an effective display portion of a video signal and embedding the control data in a portion of the video signal in which the image data is not embedded so that the control data of the video signal itself controls processing to be executed in at least one of the projection unit and the image capturing unit, and
in the receiving apparatus,
a dividing step is executed of receiving the video signal from the transmitting apparatus and dividing the video signal into the image data and the control data so that the control data of the received video signal itself controls processing to be executed in at least one of the projection unit and the image capturing unit.

8. An information processing apparatus, comprising:
a first obtaining unit configured to obtain image data of a projection pattern to be projected onto an object;
a second obtaining unit configured to obtain control data including control information for controlling processing to be executed in at least one of a projection unit and an image capturing unit using the image data; and
a data embedding unit configured to generate a video signal by embedding the image data in an effective display portion of a video signal and embedding the control data in a portion of the video signal in which the image data is not embedded so that the control data of the video signal itself controls processing to be executed in at least one of the projection unit and the image capturing unit.

9. A control method of an information processing apparatus, comprising the steps of:
a first obtaining step of obtaining image data of a projection pattern to be projected onto an object;
a second obtaining step of obtaining control data including control information for controlling processing to be executed in at least one of a projection unit and an image capturing unit using the image data; and
a data embedding step of generating a video signal by embedding the image data in an effective display portion of a video signal and embedding the control data in a portion of the video signal in which the image data is not embedded so that the control data of the video signal itself controls processing to be executed in at least one of the projection unit and the image capturing unit.

10. A non-transitory computer-readable storage medium storing a computer program for causing a computer to execute the step of the control method of an information processing apparatus according to claim 9.

11. The information processing system according to claim 1, wherein the control data is information representing a projection timing of a projection pattern by the projection unit.

12. The information processing system according to claim 1, wherein the control data is information regarding luminance when the projection unit projects a projection pattern.

13. The information processing system according to claim 1, wherein the control data is information representing a capturing timing by the image capturing unit.

14. The information processing system according to claim 1, wherein the control data is information representing a capturing range by the image capturing unit.

* * * * *